United States Patent [19]
Holzl et al.

[11] Patent Number: 6,146,000
[45] Date of Patent: Nov. 14, 2000

[54] DEVICE FOR ROTATING AN EMITTER DEVICE EMITTING A LASER BEAM FOR THE PURPOSE OF GENERATING A PLANE OR A CONICAL SURFACE

[75] Inventors: Johannes Holzl, Munich; Hans-Jurgen Lienesch, Horstel; Volker Konetschny, Putzbrunn, all of Germany

[73] Assignee: Pruftechnik Dieter Busch AG, Ismaning, Germany

[21] Appl. No.: 08/961,531

[22] Filed: Oct. 30, 1997

[30] Foreign Application Priority Data

Oct. 31, 1996 [DE] Germany .............................. 196 43 955

[51] Int. Cl.[7] .................................................. F21K 27/00
[52] U.S. Cl. .............................. 362/259; 362/35; 362/272
[58] Field of Search .............................. 362/259, 35, 272, 362/286; 33/DIG. 21

[56] References Cited

U.S. PATENT DOCUMENTS 5,727,880  3/1998  Hollander .................................. 374/121

*Primary Examiner*—Sandra O'Shea
*Assistant Examiner*—Peggy A. Neils
*Attorney, Agent, or Firm*—Kirkpatrick & Lockhart LLP

[57] ABSTRACT

A device for rotating an emitter device emitting a laser beam L about a rotation axis for the purpose of generating a plane or a conical surface has an elongated body of revolution 2 which carries the emitter device 1 and is held rotatably at the ends on a fixed holder 5 by means of a pivot bearing 3, 4 in each case, the pivot bearing 3, 4 comprising a conical seat 16 and a bearing member 17 engaging in the latter and having a rounded outer surface concentric with the rotation axis, and the conical seat 16 and the bearing member 17 being prestressed (20) against one another.

24 Claims, 3 Drawing Sheets

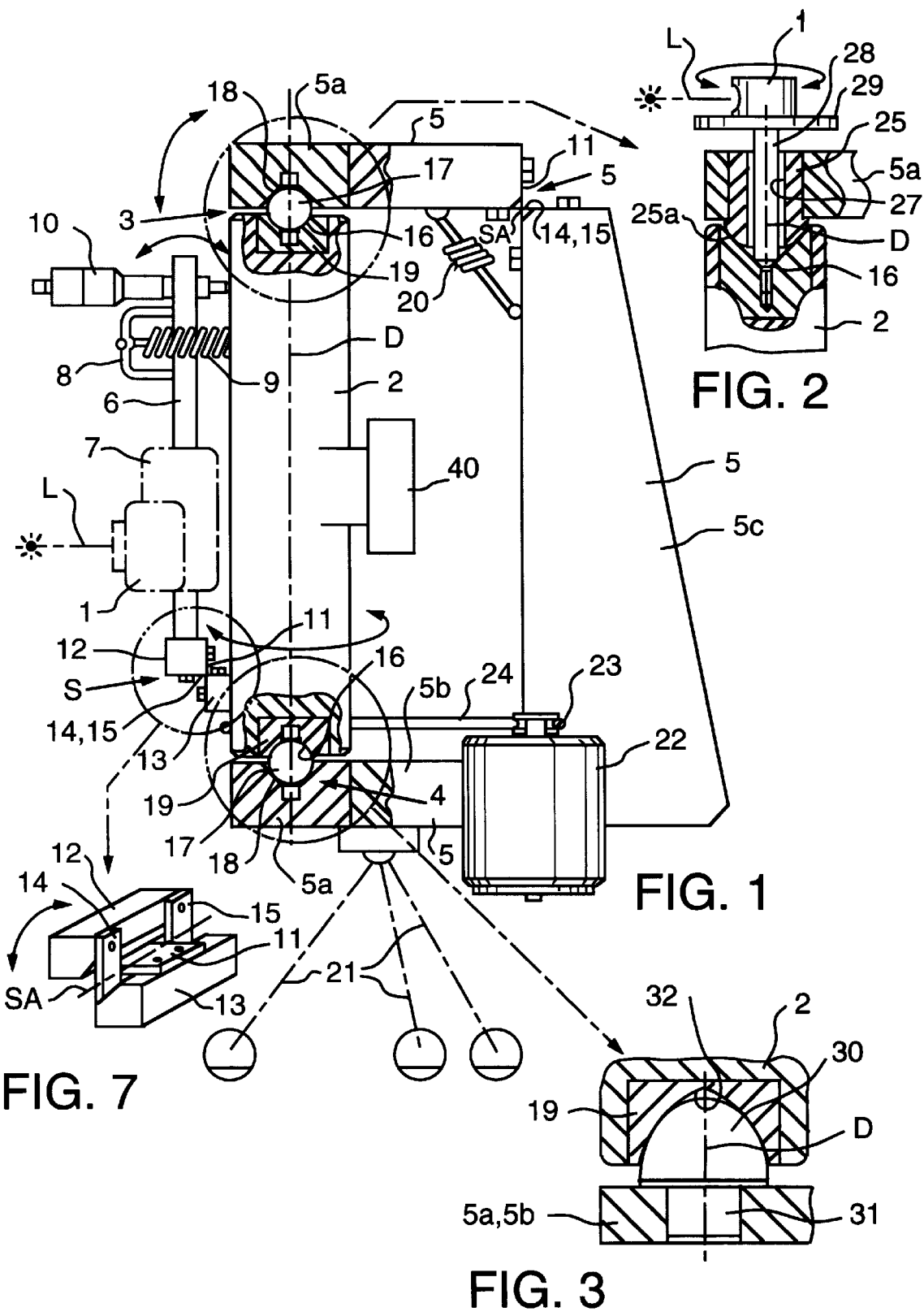

DEVICE FOR ROTATING AN EMITTER DEVICE EMITTING A LASER BEAM FOR THE PURPOSE OF GENERATING A PLANE OR A CONICAL SURFACE

BACKGROUND OF THE INVENTION

The invention relates to a device in accordance with device for rotating an emitter device.

BRIEF SUMMARY OF THE INVENTION

It is the object of the invention to create a device for rotating an emitter device by means of which it is possible to achieve on a length of 10 m a very small maximum laser beam deviation of the order of magnitude of, for example, 10 to 50 µm from a prescribed spatially fixed reference beam, and which nevertheless is distinguished by very high flexural and torsional strengths of their structural elements, and by a high insensitivity and resistance to stresses, in particular shocks, during manipulation, with the result that it is possible to use it to measure, in particular, flat surfaces such as, for example, machine beds, machine erection frames and more with a very high accuracy even under rough operating conditions.

For the purpose of mounting structural elements in a highly precise rotatable fashion with respect to one another, it is known to use precision ball bearings, or to mount the elements, for example easily running precision parts of clocks, between pivots.

The target accuracy for the device according to the invention cannot be achieved using precision ball bearings, and the known pivoting bearing has the disadvantage that it is very susceptible to shocks and not robust enough, thus it is very high sensitivity to transportation.

The above named object of the invention is achieved by a device for rotating an emitter device emitting a laser beam about a rotation axis, enclosing a presettable angle with the laser beam for the purpose of generating a plane or a conical surface, wherein the emitter device is fastened to an elongated solid body of revolution which, with its ends, is mounted by means of a pivot bearing in each case on a holder which can be fixed in space, such that it can rotate about a longitudinal axis of the body forming the rotation axis, and wherein each pivot bearing comprises a conical seat, concentric with the rotation axis on the body of revolution or on the holder, and a bearing member fastened to the holder or to the body of revolution having a rounded outer surface which is concentric with the rotation axis and engages the conical seat, and a bearing member being prestressed against one another in a direction of the rotation axis in the case of each pivot bearing.

The invention is based on the finding that, on the one hand, rotationally symmetrical bearing members having a rounded outer surface, for example balls, can be produced, in particular can be ground, with very high accuracy and that, on the other hand, under prestressing such bearing members are more or less grounded with time into the associated conical seat, with the result that there is constructed between these parts a contact surface essentially in the form of a circular ring which increases the insensitivity to shocks, on the one hand, and increases the precision of the bearing, on the other hand.

The present invention provides that the body of revolution be a solid rigid axle and the holder is designed as a solid hollow body surrounding the rigid axle from which the body of revolution projects with one of its ends and carries the emitter at the end face. The body of revolution may have an outer surface which is spherical.

The present invention further provides for at least one of the two bearing members to be a ball, wherein the at least one ball may be inserted into a conical depression in the body of revolution or in the holder and is fastened therein. For instance, the ball may be bonded into the conical depression. The conical seat may be constructed on a separate seating part fastened to the body of revolution or to the holder.

The present invention provides that the prestressing is provided by a spring which is stretched between a pivotable fork arm and the part of the holder connecting the fork arm.

The present invention provides for the device to be defined by a solid stand which can be fixed on a holder for fixing the holder in a desired position in space. The present invention provides for the stand to be attached laterally on the outside to a rigid fork arm or to be attached at the end face to the end of the holder projecting from the body of revolution. The stand can also be attached laterally on the outside of the holder.

The present invention further provides for the holder to be configured in a shape of a fork such that it spreads around the body of revolution at the end faces with its fork arms and bearing members are arranged on the ends of the faces of the body of revolution and the conical seat is arranged at the free end of the fork arms of the holder or vice versa. The two fork arms of the holder can be pivoted about a pivoting axis which crosses the rotation axis at a distance essentially at right angles, is articulated to the remainder of the holder, and is elastically braced against the latter toward the body of revolution. One of the fork arms of the holder may be provided with a continuous bore which also extends through the bearing member, adjoins the conical seat, and is coaxial with the rotational axis, and wherein the emitter device is attached to a carrier which is fastened to a bolt penetrating the bore and resiliently connected to the body of revolution.

The present invention further provides for the solid, rigid axle to serve as a holder and the body of revolution is designed as a solid, rigid, hollow body which surrounds said axle, is supported at one end face internally on the neighboring end face of the holder by means of one pivot bearing, carries the emitter externally at the end face or on a circumferential side, and from which the holder projects with one end at the other end face.

The present invention provides for one of the pivot bearings to be located on the circumferential side of the holder in the vicinity of the end of the holder projecting from the body of revolution, the rounded bearing member of the pivot bearing being fastened on a circumferential side to the holder, in a fashion surrounding the latter at a rounded ring, and the associated conical seat being constructed at a collar of the body of revolution which surrounds the holder and extends radially inward. Also, one pivot bearing can be arranged at the end face of the other end of the body of revolution, and the other pivot bearing is located on the circumferential side of the body of revolution in the vicinity of the end of the body of revolution projecting from the holder, the rounded bearing member being fastened on a circumferential side to the body of the revolution in a fashion surrounding the latter, as an externally rounded ring, and the conical seat being constructed at a collar of the holder which surrounds the body of revolution and extends radially inward.

The present invention provides strip bearings which in each case have a wide middle strip which is fastened non-rotatably to the two parts to be connected in the strip plane in each case and two side strips which are arranged on both sides thereof in a neighboring fashion and are fastened to the two parts to be connected, in a plane which is essentially at right angels to the plane of the middle strip, wherein the strips consist essentially of material which is essentially inextendable and at least within limits, flexible, such as spring metal.

The present invention further provides for an end wall being averted from the projecting end of the holder, the body of revolution having a seating part which is arranged essentially centrally, can be axially displaced within limits against a spring force and is held on the remaining part of the body of revolution via a leaf spring or the like.

The present invention provides the emitter device being attached to the body of revolution at an adjustable angle.

BRIEF DESCRIPTION OF THE SEVERAL VIEWS OF THE DRAWINGS

The invention is explained in more detail below using exemplary embodiments and with the aid of the drawing, in which:

FIG. 1 shows a first embodiment of the device in a side view with elements partly cut away, FIG. 2 shows a configuration of the upper pivot bearing of the device which deviates from the embodiment according to FIG. 1, FIG. 3 shows a configuration of the lower bearing of the device which deviates from the embodiment according to FIG. 1, FIG. 7 shows a perspective view of the strip bearing employed in the embodiments in accordance with FIGS. 1 to 6.

DETAILED DESCRIPTION OF THE INVENTION

Figure 4:
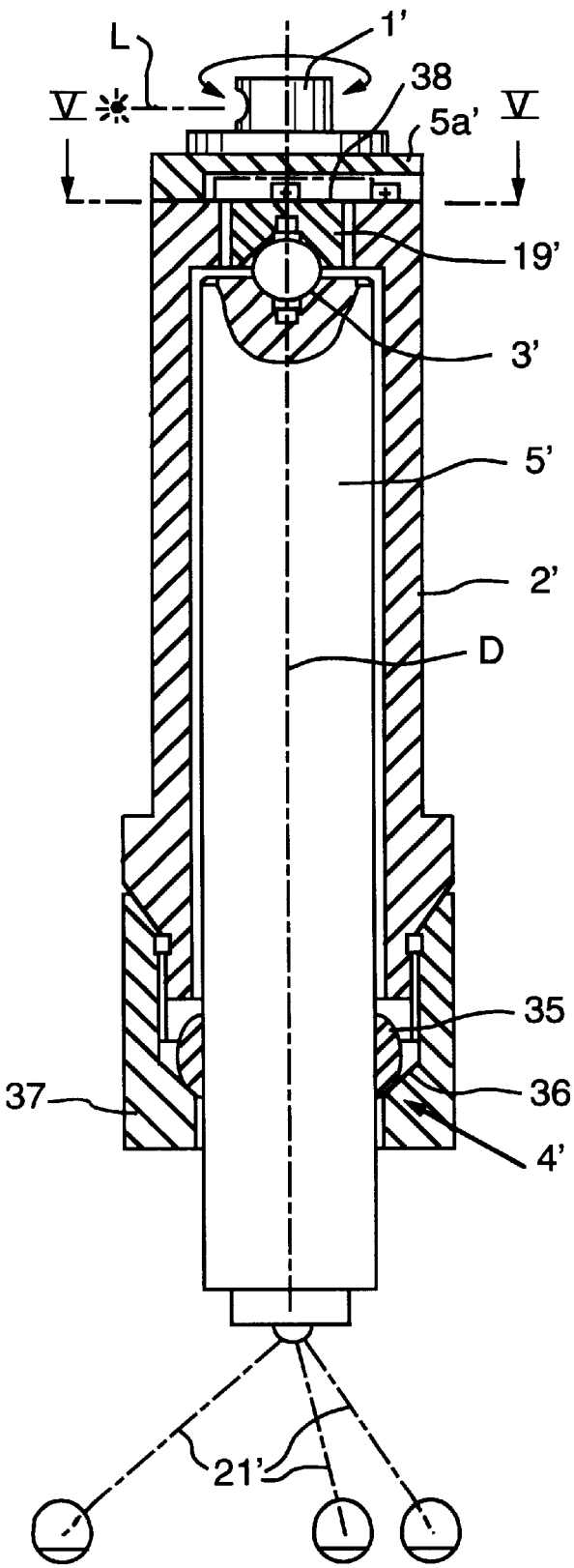
FIG. 4 shows a second embodiment, deviating from FIG. 1, of the device in a side view and partly in a longitudinal section.

The device in accordance with FIG. 1 serves to rotate an emitter device 1 emitting a laser beam L (indicated diagrammatically), such that the laser beam L generates a plane or a conical surface depending on the setting of its angle with respect to the rotation axis D of the device.

In the embodiment according to FIG. 1, the emitter device is fastened to an elongated solid body of revolution 2 in the form of a solid, rigid axle which, with its ends, is mounted by means of a pivot bearing 3 and 4, respectively, in each case on a holder 5 which can be fixed in space, such that it can rotate about its longitudinal axis forming the rotation axis D. Here, the body of revolution 2 preferably has a circular cross section.

In the embodiment according to FIG. 1, the emitter 1 is fastened in a height-adjustable fashion to a holder 5 which comprises a slide rod 6, extending approximately parallel to the rotation axis D and pivotably connected at its lower end to the body of revolution 2, a sliding piece 7, slidably attached to said slide rod, capable of having its height level fixed and carrying the emitter device 1, a helical tension spring 9, fastened at one end to the slide rod via a bow 8 and at the other end to the body of revolution, and a micrometer screw 10 which can be adjusted with respect to the slide rod 6 at right angles to the longitudinal axis thereof and via which the slide rod 6 is supported against the body of revolution 2. The angle between the longitudinal axis of the slide rod 6 and the rotation axis D can be set and varied precisely by adjusting the micrometer screw 10 with respect to the slide rod 6.

The articulated connection between the slide rod 6 and the body of revolution 2 at the lower end of the slide rod 6 is provided by a strip bearing which has a middle, relatively wide strip 11, which by means of fastening blocks 12 and 13 is fastened nonrotatably to the two parts 2, 6 to be connected, in the strip plane in each case and two side strips 14, 15, which are arranged on both sides of the strip 11 in a fashion adjacent to the latter and are permanently attached to the fastening blocks 12 and 13 at right angles to the middle strip 11. The strips 11, 14 and 15 consist of essentially inextensible, and, at least within limits, flexible material, preferably spring metal. A perspective view of such a strip bearing is shown in FIG. 7.

In the device according to FIG. 1, the pivot bearings 3, 4 are designed to be mutually identical, each pivot bearing 3 or 4 comprising a conical seat 16, concentric with the rotation axis D, in the respective end face of the body of revolution 2, and a bearing member 17, fastened to the holder 5, having a rounded outer surface which is concentric with the rotation axis D and engages in the seat 16.

In the embodiment according to FIG. 1, the bearing member 17 is in each case a ball which is inserted, preferably bonded, in a conical depression 18 in the holder 5. The conical seats 16 in the end faces of the body of revolution 2 are constructed in each case on a separate seating part 19 which is let into the body of revolution 2 and fastened therein.

In the embodiment according to FIG. 1, the holder 5 is configured in the shape of a fork such that it is spread around the body of revolution 2 at the end faces with its fork arms 5a, 5b, the conical depressions 18 in which the spherical bearing members 17 are bonded being located at the free ends of the fork arms 5a, 5b. Here, the body of revolution 2 is a solid, rigid axle which is mounted between the free ends of the fork arms 5a, 5b of the holder 5 in a fashion such that it can rotate about the longitudinal axis D of the latter.

In order to achieve the prestressing of the bearing members 17, bonded in the conical depressions 18 in the fork arms 5a, 5b, and the conical seats 16 in the end faces of the body of revolution 2 with respect to one another, the fork arm 5a of the holder 5 which is the upper one in FIG. 1 is pivoted to the remainder of the holder 5 such that it can pivot about a pivoting axis SA, which crosses the rotation axis D at a distance essentially at right angles, and said arm is elastically braced against said holder toward the body of revolution 2 by means of a spring 20. The fork-shaped holder 5 is fastened to a solid stand 21 by means of which it can be fixed in space in a desired, more or less vertical position.

The emitter device 1 can be rotated by applying a force using a motor 22 which is fastened to the fork-shaped holder 5 by a motor shaft 23, which is essentially parallel to the rotation axis D, and can make use of a belt or the like 24, which is wrapped around the body of revolution 2 and a pinion at the end of the motor shaft 23, to pivot or continuously rotate the body of revolution 2 about its rotation axis D over a desired angle of rotation.

Fastened to the body of revolution 2 on the side averted from the emitter with its holder, is a counterweight 40 which balances the mass of the emitter 1 and its holder.

FIG. 2 shows a modification of the bearing, which can be used instead of the upper pivot bearing described in connection with FIG. 1 for the purpose of rotatably holding the body of revolution 2. In the case of the pivot bearing according to FIG. 2, a bearing member 25 provided with a shaft and having the rounded outer surface is fastened in a bore on the outer end of the fork arm 5a. The rounded outer surface 25a of the bearing member 25 facing the body of revolution 2 is rotationally symmetric with respect to the rotation axis D of the body of revolution 2 and, as in the case of the embodiment according to FIG. 1, engages in a conical seat 16 in the end face of the body of revolution 2. The bearing member 25 has a continuous bore 27, which is essentially parallel to the rotation axis D and through which there extends, with sufficient play for free rotation, a bolt 28 which is screwed in a rotationally fixed fashion coaxially with the rotation axis D into the body of revolution 2. A disk-shaped carrier 29 for the emitter 1 is fastened to the free end of the bolt 28. The advantage of this design of the pivot bearing and of emitter holder consists in that the laser beam L can be rotated by 360° without falling on any elements of the device in the process.

FIG. 3 shows a further modification of the pivot bearing by comparison with that previously described in connection with FIG. 1. In the case of this embodiment, in a fashion similar to the embodiment in accordance with FIG. 2, the bearing member 30 has a shaft 31 and is bonded with the latter in a bore at the free end of the fork arm 5a and/or 5b such that its line of rotational symmetry coincides with the rotation axis D of the body of revolution 2. It is clearly to be seen that although the outer surface of the bearing member 30 is likewise rounded here, as well, it deviates from the spherical shape as was described at the beginning for the bearing members 17 in the case of FIG. 1. Such shapes can also be produced with high precision.

As in the case of FIG. 1, in the embodiment according to FIG. 3 the bearing member 30 also engages under prestress in a depression, denoted by 32, in the end face of the body of revolution 2, although that depression is not exactly conical here, but has a configuration which is slightly concavely rounded.

The embodiment according to FIG. 3 has the advantage that there is quickly ground in between the depression 32 and the bearing member 30 a contact surface which is wider than in the case of the ball and cone configuration in accordance with FIG. 1. The term "conical" is as well to be understood to include such designs of the seat.

Figure 5:
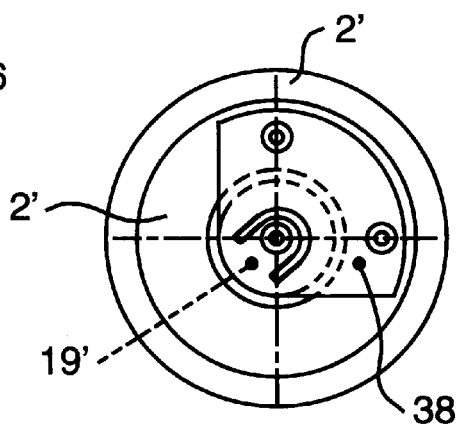
FIG. 5 shows a plan view of the device according to FIG. 4 in a section along the line of section V—V in FIG. 4.

FIGS. 4 and 5 show a further embodiment of the device. Said embodiment differs from that in accordance with FIG. 1 in that a solid, rigid axle serves as holder 5', and the body of revolution 2' is designed as a solid, rigid hollow body which surrounds said axle and carries the emitter 1' outside on its upper end face by means of a holder 5a' extending essentially parallel to the end face. At the other end face of the body of revolution 2', the holder 5' projects from the body of revolution 2', there being fastened to its end face there a solid stand 21' by means of which the device in accordance with FIG. 4 can be set up in a stable fashion on a support.

Located at the end face at the upper end of the holder 5' is a pivot bearing 3' which essentially corresponds to the pivot bearing 3 in the embodiment according to FIG. 1. What differs is that the seat element 19' in the body of revolution 2' can be moved against spring force in the direction of the rotation axis D and is held resiliently against the remainder of the body of revolution 2' via a leaf spring 38 or the like.

The other pivot bearing 4' is located on the circumferential side of the holder 5' in the vicinity of the end of the holder 5' projecting from the body of revolution 2', the rounded bearing member 35 being fastened to the holder 5' in a fashion surrounding the latter, and the conical seat 36 being constructed at a collar 37, which surrounds the holder 5', extends radially inwards and is fastened to the body of revolution 2'.

The embodiment in accordance with FIGS. 4 and 5 permits the laser beam to be used to generate over an angle of rotation of 360° a plane which extends essentially parallel with the support of the stand 21' or a conical surface whose central axis is at right angles to said support.

Bearing members which have the shape of the bearing member 35 of the embodiment in accordance with FIG. 4 and are configured as an externally rounded ring can also be produced with the highest precision.

Figure 6:
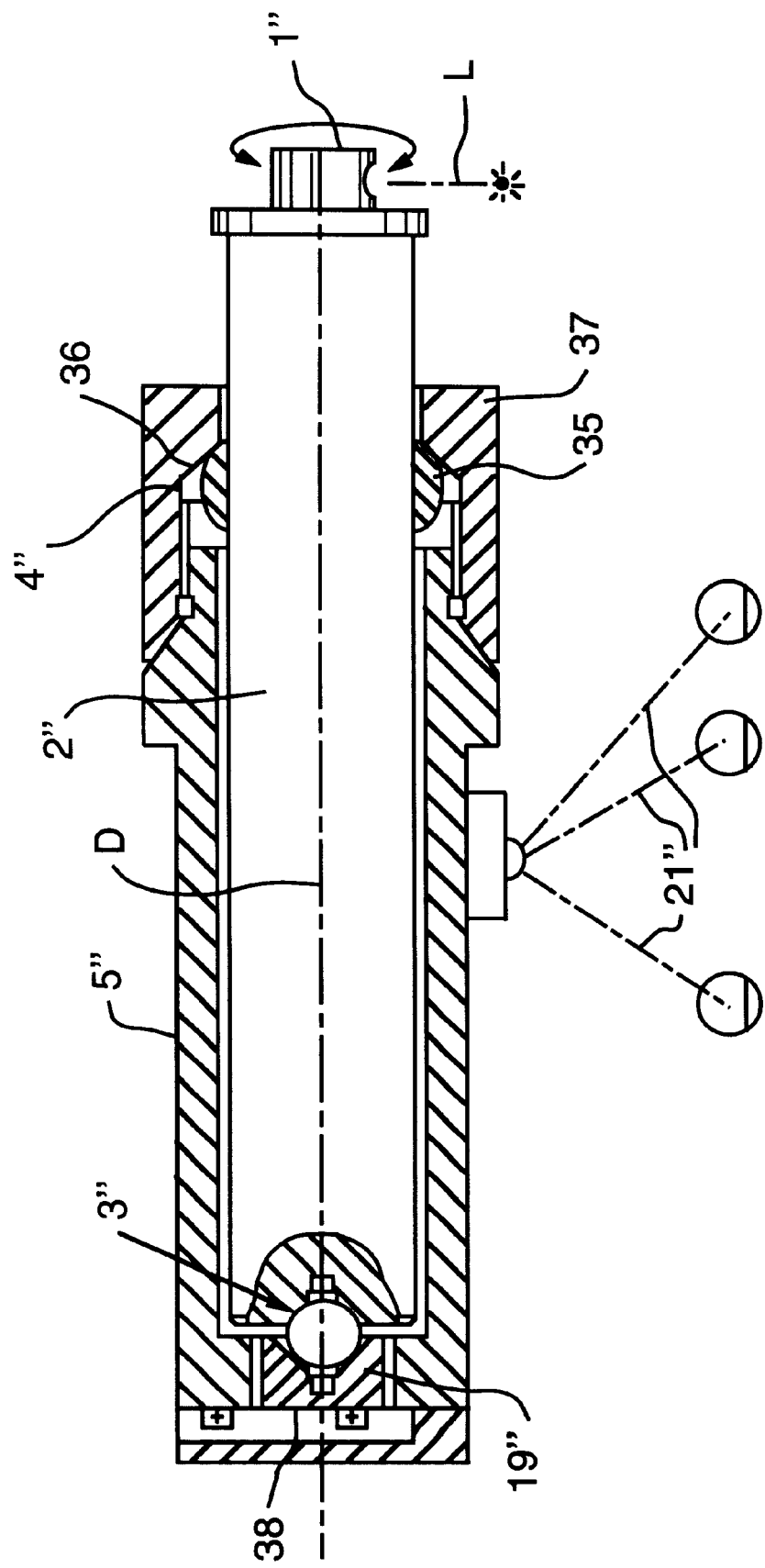
FIG. 6 shows a third embodiment of the device in a side view as well as partly in longitudinal section.

FIG. 6 shows a third embodiment of the device, which essentially differs from that in accordance with FIGS. 4 and 5 in that the outer body configured as a hollow body forms the holder 5", while the solid, inner body serves as the body of revolution 2', the solid stand 21' being fastened to the external circumference of the body of revolution 2', the emitter 1" being permanently attached to the end face of the body of revolution 2', and the device being held by the stand 21 such that the rotation axis D extends parallel or somewhat obliquely to the support on which the stand 21" stands.

Planes or conical surfaces which project upward from the support of the stand 21 can be generated using the device according to FIG. 6.

It is also possible in the case of the embodiments in accordance with FIG. 4 and FIG. 6 for the emitter to be fastened to the body of revolution 2' such that its angle can be adjusted within limits. This should preferably be performed using a pivot bearing 5 of the type employed in the case of the embodiment in accordance with FIG. 1.

We claim:

1. A device for rotating an emitter device (1; 1'; 1") emitting a laser beam (L) about a rotation axis (D), enclosing a presettable angle with the laser beam (L), for the purpose of generating a plane or a conical surface, wherein the emitter device (1; 1'; 1") is fastened to an elongated solid body of revolution (2; 2'; 2") which, at its ends, is mounted by means of a pivot bearing (3,4; 3',4'; 3",4") in each case on a holder (5; 5'; 5") which can be fixed in space, such that it can rotate about a longitudinal axis of said body forming the rotation axis (D), and wherein each pivot bearing (3,4; 3',4'; 3",4") comprises a conical seat (16; 32; 36), concentric with the rotation axis (D), on the body of revolution (2; 2'; 2") or on the holder (5; 5';5"), and a bearing member (17; 25; 30; 35), fastened to the holder (5; 5'; 5") or to the body of revolution (2; 2'; 2"), having a rounded outer surface which is concentric with the rotation axis (D) and engages the conical seat (16; 32; 36), and the bearing member (17; 25; 30; 35) being prestressed against one another in the direction of the rotation axis (D) in the case of each pivot bearing (3,4; 3',4'; 3",4").

2. The device as claimed in claim 1, wherein the rounded outer surface is a spherical surface.

3. The device as claimed in claim 2, wherein at least one of the two bearing members is a ball (17).

4. The device as claimed in claim 3, wherein the ball (17) is inserted into a conical depression (18) in one of the body of revolution and the holder, and is fastened therein.

5. The device as claimed in claim 4, wherein the ball (17) is bonded into the conical depression (18).

6. The device as claimed in claim 1, wherein the conical seat (16) is constructed on a separate seating part (19; 19'; 19") fastened to the body of revolution (2; 2') or to the holder (5").

7. The device as claimed in claim 1, defined by a solid stand (21; 21'; 21"), which can be fixed on the holder (5; 5'; 5"), for fixing the holder in a desired position in space.

8. The device as claimed in claim 1, wherein the holder (5) is configured in the shape of a fork such that it spreads around the body of revolution (2) at the end faces with its fork arms (5a, 5b), the bearing members (17) being arranged on the end faces of the body of revolution (2), and the conical seats (16) being arranged at the free ends of the fork arms (5a, 5b) of the holder (5), or vice versa (FIG. 1).

9. The device as claimed in claim 8, wherein the body of revolution (2) is a solid, rigid axle.

10. The device as claimed in claim 8, wherein the bearing members (17) are attached to the holder (5) and the conical seats (16) are arranged on the body of revolution (2).

11. The device as claimed in one of claims 8, wherein one (5a) of the two fork arms (5a, 5b) of the holder (5) can be pivoted about a pivoting axis (SA) which crosses the rotation axis (D) at a distance essentially at right angles, is articulated to the remainder of the holder (5), and is elastically braced (20) against the latter toward the body of revolution (2).

12. The device as claimed in claim 11, wherein the prestressing is provided by a spring (20) which is stretched between the pivotable fork arm (5a) and the part (5c) of the holder (5) connecting the fork arms (5a, 5b).

13. The device as claimed in claim 8, wherein one (5a) of the fork arms (5a, 5b) of the holder (5) is provided with a continuous bore (27), which also extends through the bearing member (25), adjoins the conical seat (16) and is coaxial with the rotation axis (D), and wherein the emitter device (1) is attached to a carrier (29) which is fastened to a bolt (28) penetrating the bore (27) and rigidly connected to the body of revolution (2) (FIG. 2).

14. The device as claimed in claim 7, wherein the stand (21) is attached laterally on the outside to a rigid fork arm (5b).

15. The device as claimed in claim 1, wherein the solid, rigid axle serves as a holder (5'), and the body of revolution (2') is designed as a solid, rigid hollow body which surrounds said axle, is supported at one end face internally on the neighboring end face of the holder (5') by means of one pivot bearing (3'), carriers the emitter (1') externally at said end face or on the circumferential side, and from which the holder (5') projects with one end at the other end face (FIG. 4).

16. The device as claimed in claim 15, wherein the other pivot bearing (4') is located on the circumferential side of the holder (5') in the vicinity of the end of the holder (5') projecting from the body of revolution (2'), the rounded bearing member (35) of said pivot bearing (4') being fastened on the circumferential side to the holder (5), in a fashion surrounding the latter as a rounded ring, and the associated conical seat (36) being constructed at a collar (37) of the body of revolution (2') which surrounds the holder (5') and extends radially inwards.

17. The device as claimed in claim 15, wherein in the end wall averted from the projecting end of the holder (5') a seating part (19') is arranged essentially centrally in the body of revolution (2') and can be axially displaced within limits against a spring force (38), and is held on the remaining part of the body of revolution (2') via a leaf spring (38) or the like.

18. The device as claimed in claim 7, wherein the stand (21') is attached at the end face to the end of the holder (5') projecting from the body of revolution (2').

19. The device as claimed in claim 1, wherein the solid, rigid axle serves as a body of revolution (2"), and the holder (5") is designed as a solid hollow body which surrounds the rigid axle and from which the body of revolution (2") projects with one of its ends and carries the emitter (1") there at the end face (FIG. 6).

20. The device as claimed in claim 19, wherein one pivot bearing (3") is arranged at the end face at the other end of the body of revolution (2"), and the other pivot bearing (4") is located on the circumferential side of the body of revolution (2") in the vicinity of the end of the body of revolution (2") projecting from the holder (5"), the rounded bearing member (35) being fastened on the circumferential side to the body of revolution (2") in a fashion surrounding the latter as an externally rounded ring, and the conical seat (36) being constructed at a collar (37) of the holder (5") which surrounds the body of revolution (2") and extends radially inwards.

21. The device as claimed in claim 7, wherein the stand (21") is attached laterally to the outside of the holder (5").

22. The device as claimed in claim 1, wherein the emitter device (1; 1'; 1") is attached to the body of revolution (2; 2'; 2") at an adjustable angle.

23. The device as claimed in claim 1, wherein for the purpose of articulated connection of parts of the device use is made of strip bearings which in each case have a wide middle strip (11), which is fastened nonrotatably to the two parts (12, 13; 5a, 5c) to be connected, in the strip plane in each case, and two side strips (14, 15), which are arranged on both sides thereof in a neighboring fashion and are fastened to the two parts (12, 13; 5a, 5c) to be connected, in a plane which is essentially at right angles to the plane of the middle strip (11), the strips (11, 14, 15) consisting of material which is essentially inextensible and, at least within limits, flexible.

24. The device as claimed in claim 23, wherein the material of the strips is a spring metal.

\* \* \* \* \*